US009787701B2

(12) United States Patent
Jayawardena et al.

(10) Patent No.: US 9,787,701 B2
(45) Date of Patent: *Oct. 10, 2017

(54) INSIDER ATTACK RESISTANT SYSTEM AND METHOD FOR CLOUD SERVICES INTEGRITY CHECKING

(71) Applicant: AT&T INTELLECTUAL PROPERTY I, L.P., Atlanta, GA (US)

(72) Inventors: Thusitha Jayawardena, Holmdel, NJ (US); Jeffrey E. Bickford, Somerset, NJ (US); Mikhail Istomin, Brooklyn, NY (US); John Liefert, Matawan, NJ (US); Gokul Singaraju, Edison, NJ (US); Christopher Van Wart, Ocean, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,818

(22) Filed: Mar. 16, 2017

(65) Prior Publication Data

US 2017/0187732 A1  Jun. 29, 2017

Related U.S. Application Data

(63) Continuation of application No. 14/825,419, filed on Aug. 13, 2015, now Pat. No. 9,606,854.

(51) Int. Cl.
*G06F 21/00* (2013.01)
*H04L 29/06* (2006.01)
(Continued)

(52) U.S. Cl.
CPC ...... *H04L 63/1416* (2013.01); *G06F 9/45558* (2013.01); *G06F 11/0709* (2013.01);
(Continued)

(58) Field of Classification Search
CPC .................................................. G06F 17/30867
See application file for complete search history.

(56) References Cited

U.S. PATENT DOCUMENTS

| 7,975,286 B1 * | 7/2011 | Fickey | H04L 63/1433 726/1 |
| 8,706,701 B1 * | 4/2014 | Stefanov | G06F 17/30197 707/687 |

(Continued)

FOREIGN PATENT DOCUMENTS

| CN | 103843002 | 6/2014 |
| EP | 2766814 | 8/2014 |
| WO | 2014144857 | 9/2014 |

OTHER PUBLICATIONS

Neumann "Risks and myths of cloud computing and cloud storage." Communications of the ACM 57.10 (2014): pp. 25-27. http://www.csl.sri.com/users/neumann/cacm234.pdf.

(Continued)

*Primary Examiner* — Ali Shayanfar
(74) *Attorney, Agent, or Firm* — Akerman LLP; Michael K. Dixon; Mammen (Roy) P. Zachariah, Jr.

(57) ABSTRACT

An insider attack resistant system for providing cloud services integrity checking is disclosed. In particular, the system utilizes an automated integrity checking script and virtual machines to check the integrity of a service. The system may utilize the integrity checking script and virtual machines to execute a set of operations associated with the service so as to check the integrity of the service. When executing the set of operations, the system may only have access to the minimum level of access to peripherals that is required for each operation in the set of operations to be executed. After each operation is executed, the system may log each result for each operation, and analyze each result to determine if a failure exists for any of the operations. If a (Continued)

failure exists, the system may determine that a change in an expected system behavior associated with the service has occurred.

20 Claims, 7 Drawing Sheets

(51) Int. Cl.
*G06F 11/07* (2006.01)
*G06F 9/455* (2006.01)

(52) U.S. Cl.
CPC ........ *G06F 11/079* (2013.01); *G06F 11/0712* (2013.01); *G06F 11/0751* (2013.01); *H04L 63/145* (2013.01); *G06F 2009/45587* (2013.01)

(56) References Cited

U.S. PATENT DOCUMENTS

| | | | |
|---|---|---|---|
| 8,799,190 B2* | 8/2014 | Stokes | G06F 21/563 |
| | | | 706/12 |
| 8,805,995 B1 | 8/2014 | Oliver | |
| 8,813,234 B1 | 8/2014 | Bower et al. | |
| 8,839,426 B1* | 9/2014 | Brueckner | 726/22 |
| 8,856,542 B2 | 10/2014 | Tatarinov et al. | |
| 8,978,136 B2 | 3/2015 | Day | |
| 9,021,092 B2* | 4/2015 | Silva | H04L 63/1425 |
| | | | 709/223 |
| 9,411,975 B2* | 8/2016 | Smith | G06F 21/6218 |
| 9,606,854 B2* | 3/2017 | Jayawardena | G06F 11/079 |
| 2010/0250497 A1 | 9/2010 | Redlich et al. | |
| 2012/0203877 A1 | 8/2012 | Bartholomay et al. | |
| 2013/0019306 A1* | 1/2013 | Lagar-Cavilla | G06F 21/566 |
| | | | 726/22 |
| 2013/0117848 A1 | 5/2013 | Golshan et al. | |
| 2013/0117849 A1* | 5/2013 | Golshan | G06F 21/53 |
| | | | 726/23 |
| 2013/0305357 A1* | 11/2013 | Ayyagari | H04L 63/14 |
| | | | 726/22 |
| 2014/0096134 A1 | 4/2014 | Barak et al. | |
| 2014/0137188 A1 | 5/2014 | Bartholomay et al. | |
| 2014/0208426 A1* | 7/2014 | Natarajan | H04L 63/1416 |
| | | | 726/23 |
| 2014/0237545 A1 | 8/2014 | Mylavarapu et al. | |
| 2014/0310810 A1 | 10/2014 | Brueckner et al. | |
| 2015/0135264 A1 | 5/2015 | Amiga | |
| 2015/0358312 A1 | 12/2015 | Kancharla et al. | |
| 2015/0381725 A1* | 12/2015 | Haapaoja | H04L 67/1097 |
| | | | 709/213 |
| 2016/0149877 A1 | 5/2016 | Kancharla et al. | |
| 2016/0373441 A1* | 12/2016 | Sirivara | H04L 9/0861 |

OTHER PUBLICATIONS

Bleikertz et al. "Secure Cloud Maintenance: Protecting workloads against insider attacks," ASIACCS 2012, May 2-4, 2012, Seoul, Korea, document of 10 pages. http://bleikertz.com/research/asiaccs2012.pdf.

Gotora et al, "A Survey on the Security Fight against Ransomware and Trojans in Android," International Journal of Innovative Research in Computer and Communication Engineering, vol. 2, Issue 5, May 2014, pp. 4115-4123. http://www.ijircce.com/upload/2014/may/4O_ASurvey.pdf.

Villeneuve et al., "Detecting APT Activity With Network Traffic Analysis," Trend Micro Corporation, Research Paper 2012, document of 15 pages. http://www.trendmicro.pl/cloud-content/us/pdfs/security-intelligence/white-papers/wp-detecting-apt-activity-with-network-traffic-analysis.pdf.

Wei et al., "Managing security of virtual machine images in a cloud enviroment," ACM 2009, pp. 91-96.

* cited by examiner

INSIDER ATTACK RESISTANT SYSTEM AND METHOD FOR CLOUD SERVICES INTEGRITY CHECKING

CROSS REFERENCE TO RELATED APPLICATIONS

This application is a continuation of U.S. patent application Ser. No. 14/825,419, filed on Aug. 13, 2015, which is hereby incorporated by reference in its entirety.

FIELD OF THE INVENTION

The present application relates to technologies for integrity checking, cloud computing, virtual machines, attack detection, and system behavioral change detection, and more particularly, to an insider attack resistant system and method for providing cloud services integrity checking.

BACKGROUND

In today's society, users and organizations are increasingly utilizing network and other service providers to gain access to the Internet, request and access various types of content, access software applications, access software services, access large volumes of data, and perform a variety of other tasks and functions. As an increasing number of users and organizations continue to become increasingly reliant on technology and service providers for an ever-increasing variety of services and needs, the number of network-based attacks perpetrated by individuals both inside and outside of service provider networks will continue to increase. Attacks, such as advanced persistent threat attacks that are perpetrated by malicious insiders, have become serious problems that directly affect service providers and their subscribers on a large scale. As an example, the recent wave of ransomweb attacks that have affected websites typically involves an attacker encrypting critical parameters, such as passwords, with a secret key that the attacker controls. The changes to the systems perpetrated by such attacks are often subtle and are not noticed until the attacker removes the secret key and demands some form of ransom. Once the attacker removes the secret key, systems affected by the attack are rendered inaccessible by users. Such an attack has characteristics of both an advanced persistent threat attack and destructive malware.

In the previously described ransomweb attack, there is often a change in the dynamic system behavior that occurs during the course of the attack. For example, each time a user is authenticated, the system may have to access a secret key that is located remotely on the Internet. This change to the system behavior may go undetected. Since there may be many users accessing the service provided by the service provider at the same time, the system may need to access the Internet. As a result, this may mask the extraneous key access from the Internet. In order to counteract such attacks, current remedies include performing integrity checking on files. While file integrity checking is typically good practice, a malicious insider can easily circumvent such integrity checks due to the dynamic nature of files. For example, a malicious administrator who maintains the service may insert an encrypting script into a website associated with the service at the next scheduled code change for the website.

SUMMARY

A system and accompanying methods for providing cloud services integrity checking are disclosed. In particular, the system and methods may involve taking advantage of the elastic nature of cloud resources, software-defined networks, hypervisor layer firewalls, or any combination thereof, to implement dynamic integrity checking for various types of services. In general, the systems and methods allow for the detection of subtle changes to dynamic system behavior that would not be detectable by using file integrity checking or other techniques. In a cloud environment, there are often many ephemeral entities that are spun up and shut down on a periodic or other basis. However, some system behaviors and operations associated with services, such as, but not limited to, user authentication, system backup, and other similar system behaviors and operations remain constant. The systems and methods disclosed herein check the system level integrity of such operations.

In order to accomplish the foregoing, the systems and methods may involve utilizing an automated integrity checking script, along with virtual machines, to check the integrity of a service in a manner that is independent and decoupled from service maintenance. The integrity checking script may be treated as any other user of the service. The systems and methods may utilize the integrity checking script and virtual machines to execute a set of operations associated with the service so as to check the integrity of the service. Notably, when executing the set of operations during an integrity checking mode, the systems and methods may utilize the integrity checking script to go through each user and administrative operation associated with the service with a corresponding minimum set that is enforced by a software-defined network, hypervisor layer firewall, or any combination thereof. A minimum set may be the minimum level of access to one or more peripherals that is required for each operation in the set of operations to be executed. A peripheral may be any device, program, process, code, or any combination thereof, that needs to be accessed to complete a particular operation. During execution and integrity checking of the operations, all access, other than access to the minimum set, may be suspended.

After each operation is executed, the systems and methods may include logging each result for each operation, and analyzing each result to determine if a failure exists for any of the operations. If a failure exists, the systems and methods may include determining that a change in an expected system behavior associated with the service has occurred. If a change in the expected system behavior has occurred, the systems and methods may include generating various types of alerts to alert a service provider or administrator of the change. Additionally, the systems and methods may include performing any number of actions to correct the change in the expected system behavior, modify the system behavior, modify the service, perform any action to fix the failure, any other action, or any combination thereof. Furthermore, the systems and methods may include gathering statistics based on the integrity checking to provide another independent means of detecting subtle system behavior changes. For example, in the case of a ransomweb attack, there may be a tiny additional delay due to encryption of passwords that may be significant. Notably, the systems and methods may provide integrity checking in a manner that is resistant to insider attacks because the systems and methods are capable of performing such integrity checking independent of system maintenance operations.

In one embodiment, a system for web services integrity checking is disclosed. The system may include a memory that stores instructions and a processor that executes the instructions to perform various operations of the system. The system may perform an operation that includes activating, at a virtual machine executing a copy of a service, an integrity checking script for checking the integrity of the service. The system may then perform an operation that includes executing, by utilizing the integrity checking script and the virtual machine, a set of operations associated with the service to check the integrity of the service. Notably, the set of operations may be executed based on a minimum level of access to a peripheral that may be required for each operation in the set of operations to be executed. The system may proceed to perform an operation that includes logging each result for each operation in the set of operations after each operation is executed. Once each result is logged, the system may perform an operation that includes analyzing each logged result to determine if a failure for an operation in the set of operations exists. If a failure is determined to exist based on the analysis, the system may perform an operation that includes determining a change in an expected system behavior associated with the service has occurred.

In another embodiment, a method for providing cloud services integrity checking is disclosed. The method may include utilizing a memory that stores instructions, and a processor that executes the instructions to perform the various functions of the method. The method may include initializing, at a virtual machine executing a copy of a service, an integrity checking script for checking an integrity of the service. Additionally, the method may include executing, by utilizing the integrity checking script and the virtual machine, a set of operations associated with the service to check the integrity of the service. The set of operations may be executed based on a minimum level of access to a peripheral that may be required for each operation in the set of operations to be executed. Once each operation is executed, the method may also include storing each result for each operation in the set of operations. The method may then include analyzing, by utilizing the virtual machine, each result to determine if a failure for an operation in the set of operations exists. Moreover, the method may include determining, if the failure exists, that a change in an expected system behavior associated with the service has occurred.

According to yet another embodiment, a computer-readable device having instructions for providing cloud services integrity checking is provided. The computer instructions, which when loaded and executed by a processor, may cause the processor to perform operations including: launching, at a virtual machine executing a copy of a service, an integrity checking script for checking an integrity of the service; executing, by utilizing the integrity checking script and the virtual machine, a set of operations associated with the service to check the integrity of the service, wherein the set of operations are executed based on a minimum level of access to a peripheral that is required for each operation in the set of operations to be executed; determining each result for each operation in the set of operations after each operation is executed; analyzing, by utilizing the virtual machine, each result to determine if a failure for an operation in the set of operations exists; and determining, if the failure exists, that a change in an expected system behavior associated with the service has occurred.

These and other features of the systems and methods for providing cloud services integrity checking are described in the following detailed description, drawings, and appended claims.

DETAILED DESCRIPTION OF THE INVENTION

Figure 1:
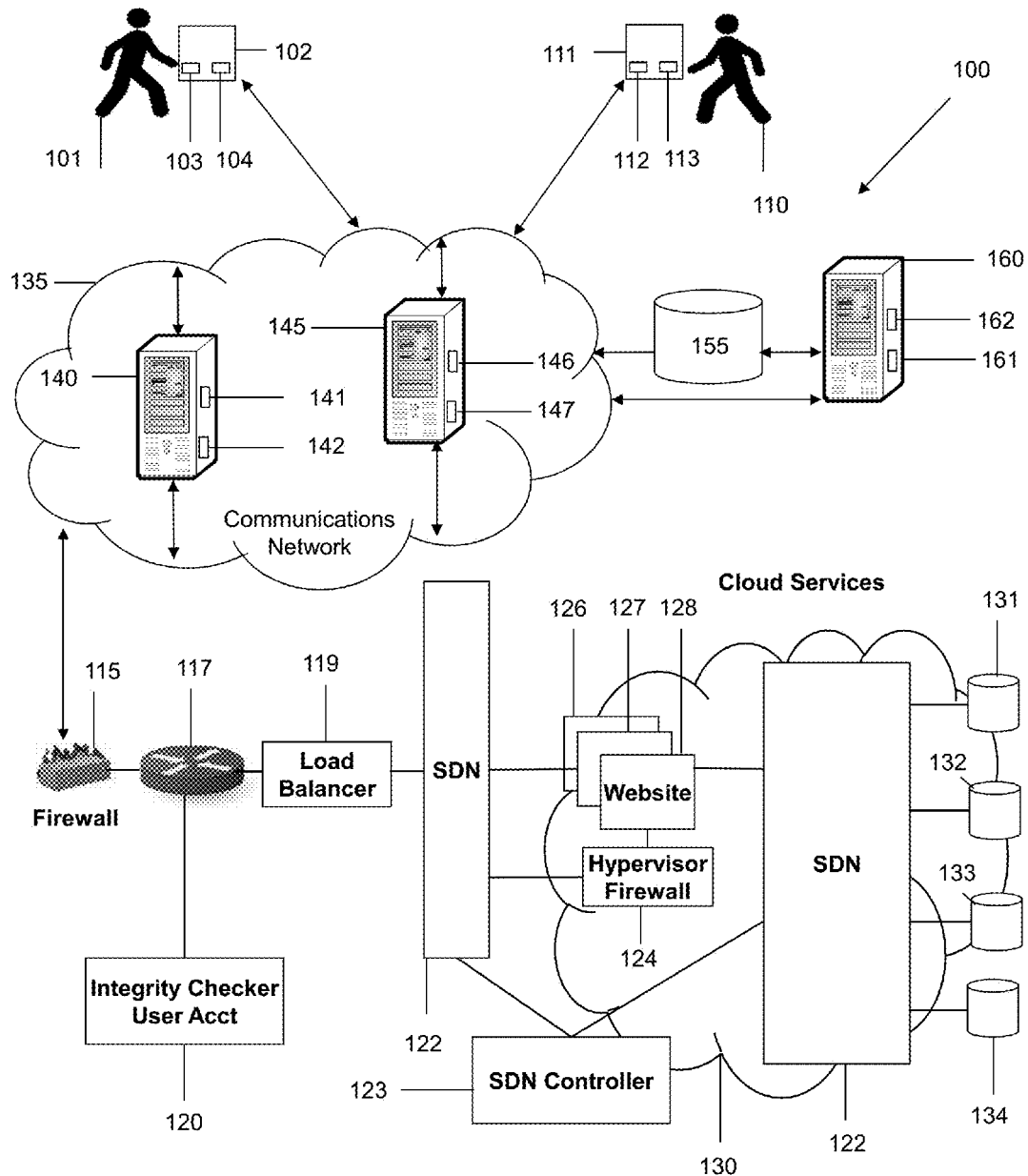
FIG. 1 is a schematic diagram of a system for providing cloud services integrity checking according to an embodiment of the present disclosure.

A system 100 and accompanying methods for providing cloud services integrity checking are disclosed. In particular, the system 100 and methods may involve taking advantage of the elastic nature of cloud resources, software-defined networks 122, hypervisor layer firewalls 124, or any combination thereof, to implement dynamic integrity checking for various types of services. In general, the system 100 and methods allow for the detection of subtle changes to dynamic system behavior that would not be detectable by using file integrity checking or other techniques. Typically, in a cloud environment, there are often many ephemeral entities that are spun up and shut down on a regular basis. However, some system behaviors and operations associated with services, such as, but not limited to, user authentication, system backup, and other similar system behaviors and operations remain constant. The system 100 and methods disclosed herein check the system level integrity of such operations associated with various types of services.

In order to accomplish the foregoing, the system 100 and methods may involve utilizing an automated integrity checking script, along with virtual machines 126-128, to check the integrity of a service in a manner that is independent and decoupled from service maintenance. The integrity checker 120, which provides the integrity checking script, may be treated as any other user of the service. The systems and methods may utilize the integrity checking script and virtual machines 126-128 to execute a set of operations associated with the service so as to check the integrity of the service. Notably, when executing the set of operations during an integrity check mode, the system 100 and methods may utilize the integrity checking script to go through each user and administrative operation associated with the service with a corresponding minimum set that is enforced by a software-defined network 122, hypervisor layer firewall 124, or any combination thereof. A minimum set may be the minimum level of access to one or more peripherals 131-134 that is required for each operation in the set of operations to be executed. Peripherals 131-134 may be any devices, programs, processes, code, or any combination thereof, that needs to be accessed to complete a particular operation. While the operations are being executed, all access other than the minimum set may be suspended. By imposing the minimum set, the system 100 may detect failures of operations and changes in system behavior that may be unexpected.

After each operation is executed, the system 100 and methods may include logging each result for each operation, and analyzing each result to determine if a failure exists for any of the operations. If a failure exists, the system 100 and methods may include determining that a change in an expected system behavior associated with the service has occurred. If a change in the expected system behavior has occurred, the system 100 and methods may include generating various types of alerts to alert a service provider or administrator of the change in expected system behavior. Additionally, the system 100 and methods may include performing any number of actions to correct the change in the expected system behavior, modify the system behavior, modify the service, perform any action to fix the failure, run anti-virus software to remove and/or block any malware, perform any other action, or any combination thereof. Furthermore, the system 100 and methods may include gathering statistics based on the integrity checking to provide another independent means of detecting subtle system behavior changes. For example, in the case of a ransomweb attack, there may be a tiny additional delay due to encryption of passwords that may be significant. Notably, the system 100 and methods may provide integrity checking in a manner that is resistant to insider attacks because the system 100 and methods are capable of performing such integrity checking independent of system maintenance operations.

As shown in FIGS. 1-5, a system 100 for providing cloud services integrity checking is disclosed. The system 100 may be configured to support, but is not limited to supporting, cloud computing services, content delivery services, satellite services, telephone services, voice-over-internet protocol services (VoIP), software as a service (SaaS) applications, gaming applications and services, productivity applications and services, mobile applications and services, and any other computing applications and services. The system may include a first user 101 that may utilize a first user device 102 to access data, content, and services, or to perform a variety of other tasks and functions. As an example, the first user 101 may utilize first user device 102 to transmit signals to access various online services, such as those provided by a content provider or service provider associated with communications network 130. The first user device 102 may include a memory 102 that includes instructions, and a processor 103 that executes the instructions from the memory 102 to perform the various operations that are performed by the first user device 102. The processor 103 may be hardware, software, or a combination thereof. In certain embodiments, the first user device 102 may be a computer, a laptop, a tablet device, a phablet, a server, a mobile device, a smartphone, a smart watch, or any other type of computing device.

Similarly, the system 100 may also include a second user 110 that may utilize a second user device 111 to also access data, content, and services, and to perform a variety of other functions. For example, the second user device 111 may be utilized by the second user 110 to transmit signals to request various types of content, services, and data provided by providers associated with communications network 130. The second user device 111 may include a memory 112 that includes instructions, and a processor 113 that executes the instructions from the memory 112 to perform the various operations that are performed by the second user device 111. The processor 113 may be hardware, software, or a combination thereof. In certain embodiments, the second user device 111 may be a computer, a laptop, a tablet device, a phablet, a server, a mobile device, a smartphone, a smart watch, or any other type of computing device.

In certain embodiments, first user device 102 and the second user device 111 may have any number of software applications stored thereon. For example, the first and second user devices 102, 111 may include cloud-based applications, database applications, gaming applications, internet-based applications, browser applications, mobile applications, service-based applications, productivity applications, video applications, music applications, streaming media applications, social media applications, any other type of applications, or a combination thereof. In certain embodiments, the software applications may include one or more graphical user interfaces so as to enable the first and second users 101, 110 to readily interact with the software applications. The software applications may also be utilized by the first and second users 101, 110 to interact with the any device in the system 100, any network in the system 100, or any combination thereof.

The system 100 may include a firewall 115, which may monitor and control incoming and outgoing traffic on behalf of the communications network 130. Notably, the firewall 115 may control the incoming and outgoing network traffic based on a variety of parameters and security rules. Additionally, the firewall 115 may serve as a barrier between communication network 130, which may be a trusted network, and outside networks and devices, such as, but not limited to, communications network 135, first and second user devices 102, 111, database 155, server 160, any other device, or any other network. In certain embodiments, the firewall 115 may be hardware, software, or a combination of hardware and software. In certain embodiments, the firewall 115 may be a program, a server, any type of computing device, or any combination thereof. Also, in certain embodiments, the firewall 115 may incorporate any the functionality of any type of firewall technology.

In addition to the firewall 115, the system 100 may include a router 117 that may perform traffic routing functions associated with routing any traffic coming into and out of communications network 130. The router 117 may be communicatively linked with the integrity checker 120, the load balancer 119, the firewall 115, any device in the system 100, any network in the system 100, or any combination thereof. The router 117 may include a memory that includes instructions, and a processor that executes the instructions from the memory to perform the various operations that are performed by the router 117. In certain embodiments, the router 117 may incorporate any functionality of any type of router technology. The system 100 may also include a load balancer 119 that may be utilized to calculate and distribute workloads for any of the devices in the system 100, any of the networks in the system 100, or any combination thereof. For example, the load balancer 119 may be utilized to optimize the use of resources, minimize response times, and avoid overloading any of the devices or networks in the system 100. The load balancer 119 may include a memory that includes instructions, and a processor that executes the instructions from the memory to perform the various operations that are performed by the load balancer 119.

Figure 2:
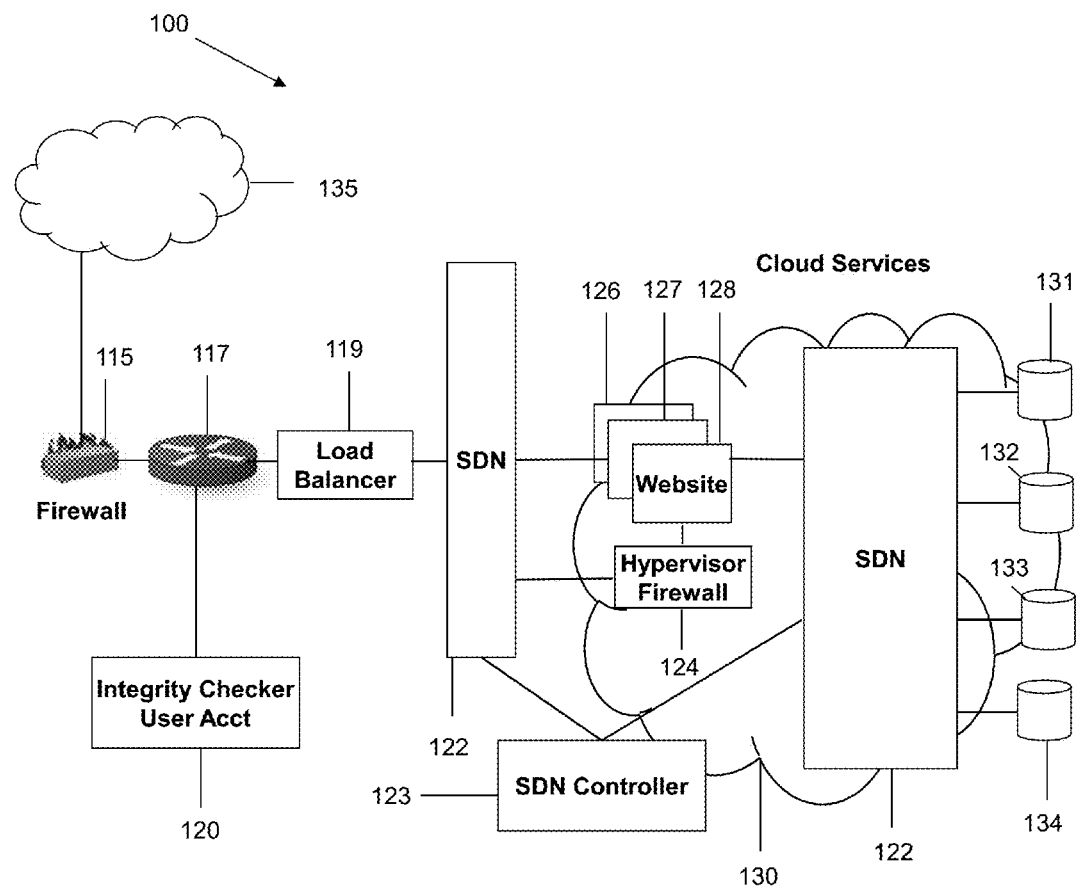
FIG. 2 illustrates the integrity checker utilized in the system of FIG. 1 operating in a normal operation mode.

The system 100 may include an integrity checker 120 that may be utilized to check and/or determine the integrity of a particular service, user operation associated with a service, administrative operation associated with a service, or any combination thereof. The service may be a cloud-based service or any other type of service. In certain embodiments, the integrity checker 120 may be a virtual machine, a program, a computing device, a server, or any combination thereof. In certain embodiments, the integrity checker 120 may include a memory that includes instructions, and a processor that executes the instructions from the memory to perform the various operations that are performed by the integrity checker 120. During operation, the integrity checker 120 may operate in a plurality modes. For example, the integrity checker 120 may operate during a normal operation mode and during an integrity checking mode. When the integrity checker 120 is operating in normal operation mode, as shown in FIG. 2 for example, the integrity checker 120 may launch an integrity checking script that may run on a periodic basis during the course of a selected timeframe. The integrity checking script may be a computer program that may be configured to execute one or more operations associated with a service. Once launched and during normal operation mode, the integrity checking script may execute each operation associated with performing a selected service while having full access to peripherals needed to perform each operation, such as peripherals/databases 131-134. Notably, the integrity checking script may be treated by the system 100 as any other user in the system, such as first and second users 101, 110. For example, during normal operation mode, the integrity checker 120 may be treated like any other user attempting to access a website and may be load balanced by the load balancer 119 to a particular copy of the website, such as a copy provided by virtual machines 126-128. In certain embodiments, the integrity checking script may be a special user account that mimics a traditional user account that may be utilized by any other user of the system 100.

Figure 3:
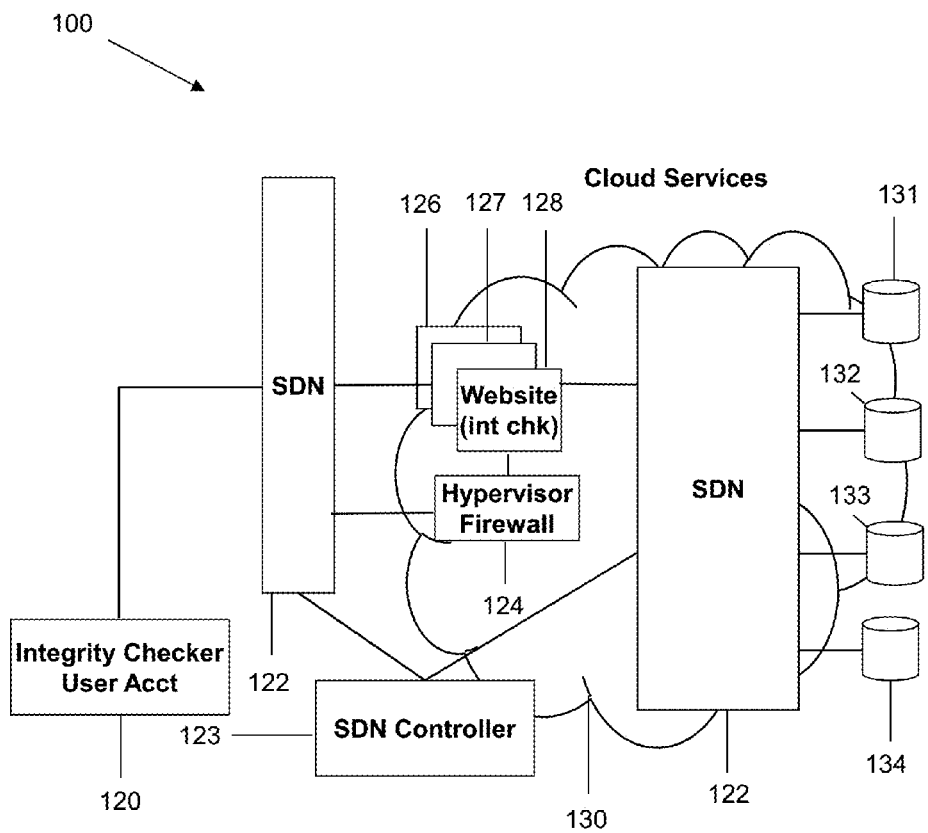
FIG. 3 illustrates the integrity checker utilized in the system of FIG. 1 operating in an integrity checking mode.

During certain time periods, the integrity checker 120 may be configured to operate in the integrity checking mode, as shown in FIG. 3, for example. When in the integrity checking mode, the integrity checker 120 may launch the integrity checking script to execute each operation associated with performing a selected service while being restricted to having only the minimum level of access to peripherals (i.e. minimum set), such as peripherals/databases 131-134, that is required for each operation. When being restricted to the minimum set, all other access to peripherals 131-134 other than the minimum set and access to network ports may be suspended. This may allow for the detection of failures associated with executing operations and for the detection of subtle changes in system behavior. One or more virtual machines 126-128 may be activated and then dedicated to the integrity checking process. For example, if the service being checked is a service provided by a website, a virtual machine 128 may be spun up that launches a copy of the website for the integrity checking process to be performed on. The virtual machines 126-128 that are spun up for the integrity checking process may only have access to the minimum level of access associated with the minimum set. In certain embodiments, the virtual machines 126-128 may launch a copy of a program providing a service, a copy of the program providing the service with or without embedded malware, or a combination thereof. In certain embodiments, the integrity checker 120 may bypass the router 117 and the load balancer 119 while in integrity checking mode.

In order to impose the minimum set during execution of each of the operations, a software-defined networking script may be synchronized with the integrity checking script while the integrity checker 120 is in the integrity checking mode. In certain embodiments, the minimum set may be imposed by utilizing the software-defined networking controller 123, which may be controlled by the software-defined networking script, which may be synchronized with the integrity checking script. The software-defined networking script may reside in the same repository as the integrity checking script. The software-defined networks 122 may incorporate any functionality and features of any type of software-defined network 122, and the software-defined controller 123 may be a computer device, a program, or any combination thereof. Notably, the software-defined networks 122 and the software-defined networking script may be utilized to realize minimal set operation checking without having to wait for a maintenance window.

In addition to imposing the minimum set by utilizing the software-defined networking script, the minimum set may also be imposed by utilizing a hypervisor layer firewall 124. The hypervisor layer firewall 124 may be a virtual network firewall or program running within a virtualized environment and may provide packet filtering and monitoring capabilities typically provided via a physical network firewall. The hypervisor layer firewall 124 may be communicatively linked with the virtual machines 126-128, the integrity checker 120, and any device, and/or any program of the communications network 130. Notably, the hypervisor layer firewall 124 may be utilized to realize minimal set operation checking without having to wait for a maintenance window. In certain embodiments, a hypervisor layer firewall 124, such as, but not limited to, vshield may be utilized to implement minimum set integrity checking. In certain embodiments, both the software-defined networks 122 and the hypervisor layer firewall 124 may be utilized in combination with one another to impose the minimum set. In some embodiments, only the software-defined networks 122 may be utilized to impose the minimum set. In other embodiments, only the hypervisor layer firewall 124 may be utilized to impose the minimum set.

As the operations associated with the service are executed during the integrity checking mode, each result of each operation may be logged in the system 100. In certain embodiments, each result of each operation may be logged with detailed timestamps for component operations. Additionally, in certain embodiments, the number of times each peripheral 131-134 is accessed during the execution of the operations may also be logged. The logged results, timestamps, and peripheral accesses may be utilized to generate statistics associated with the executed operations and the service. The logged results, timestamps, number of peripheral 131-134 accesses, and statistics may be logged in the database 155, by the virtual machines 126-128, the integrity checker 120, or any combination thereof. Once the results, accesses, statistics, and/or timestamps are logged, the system 100 may include analyzing the each result and/or any other logged information to determine if any of the operations failed during the execution process. If there are no failures, then the system 100 may determine that the service is operating normally and that the system behavior is expected. If, however, the system 100 determines that a failure of an operation has occurred, the failure may indicate that a change in expected system behavior associated with the service has occurred. For example, a change in the expected system behavior may indicate that an intruder has penetrated the system 100 and caused the change to occur.

If a failure and/or a change in expected system behavior is detected, the system 100 may generate an alert. The alert may be any type of alert, such as, but not limited to a visual alert, an audible alert, any combination thereof, or any other type of alert. The alert, for example, may be transmitted to a service provider, network administrator, the first and second users 101, 110, or any combination thereof. In certain embodiments, the alert may be a text message, an electronic mail message, an instant message, an alert web page, or any type of alert that may be sent to a provider and/or network administrator to notify them of failures and changes in expected system behavior. In certain embodiments, in addition to providing alerts, the system 100 may perform a variety of actions to correct the failure and/or change in the expected system behavior. For example, the system 100 may modify the system behavior, modify the service, execute an anti-virus program to remove any malware that may have caused the failure or change, block access to the service in question until the failure and/or system behaviors are rectified, identify an attacker, perform any type of action, or any combination thereof. Once the integrity checking process is complete, the one or more virtual machines 126-128 dedicated to integrity checking may be spun down and deactivated. The integrity checking process may be repeated as needed.

In certain embodiments, the virtual machines 126-128 may serve as an emulation of any service, process, program, device, or any combination thereof. For example, the virtual machines 126-128 may be utilized to emulate websites, software programs, functions, or any combination thereof. The virtual machines 126-128 may be configured to execute on any appropriate device in the system 100 and may incorporate any of the features and/or functionality associated with virtual machines in general. In certain embodiments, the virtual machines 126-128 may reside and run within communications network 130, however, in other embodiments, the virtual machines may be run elsewhere in the system 100. In certain embodiments, the virtual machines 126-128 may be communicatively linked with any of the devices, programs, and networks in the system 100. The virtual machines 126-128 may be spun up or spun down as needed by the system 100 and may be utilized for the integrity checking process or for any other processes in the system 100.

The peripherals 131-134 may be anything that a particular step in an operation associated with a particular service needs to access to complete the operation. In certain embodiments, the peripherals 131-134 may not be local to the software associated with implementing the service. Illustratively, the peripherals 131-134 are shown as databases in FIGS. 1-5, however, the peripherals 131-134 may be any type of device, program, service, function, software port, or any combination thereof that may need to be accessed to complete a particular operation. In certain embodiments, the peripherals 131-134 may be any type of logical construct that needs to be accessed in order to complete an operation. Notably, any type of peripheral 131-134 may be utilized in the system 100.

The communications network 130 of the system 100 may be configured to link each of the devices in the system 100 to one another, and be configured to transmit, generate, and receive any information and data traversing the system 100. In one embodiment, the communications network 130 may include any number of servers, databases, or other componentry. In certain embodiments, the communications network 130 may be configured to communicatively link with the first user device 102, the second user device 111, the firewall 115, the router 117, the load balancer 119, the integrity checker 120, the software-defined networks 122, the software-defined network controller 123, the hypervisor firewall 124, the virtual machines 126-128, the communications network 130, the peripherals/databases 131-134, the server 140, the server 145, the database 155, the server 160, the ports 165-168, the ports 170-176, or any combination thereof. The communications network 130 may also include and be connected to a cloud-computing network, a wireless network, an ethernet network, a software-defined network 122, a hypervisor layer firewall 124, a satellite network, a broadband network, a cellular network, a private network, a cable network, the Internet, an internet protocol network, a multiprotocol label switching (MPLS) network, a content distribution network, any network or any combination thereof. Illustratively, the communications network 130 is shown as including software-defined networks 122, hypervisor firewall 124, and peripherals/databases 131-134. Additionally, communications network 130 is shown as residing behind firewall 115. In certain embodiments, the communications network 130 may be part of a single autonomous system that is located in a particular geographic region, or be part of multiple autonomous systems that span several geographic regions.

In addition to communications network 130, the system 100 may also include a communications network 135. The communications network 135 of the system 100 may be configured to link each of the devices in the system 100 to one another, and be configured to transmit, generate, and receive any information and data traversing the system 100. In one embodiment, the communications network 135 may include any number of servers, databases, or other componentry. The communications network 135 may be configured to communicatively link with the first user device 102, the second user device 111, the firewall 115, the router 117, the load balancer 119, the integrity checker 120, the software-defined networks 122, the software-defined network controller 123, the hypervisor firewall 124, the virtual machines 126-128, the communications network 130, the peripherals/databases 131-134, the server 140, the server 145, the database 155, the server 160, the ports 165-168, the ports 170-176, or any combination thereof. The communications network 135 may also include and be connected to a cloud-computing network, a wireless network, an ethernet network, a software-defined network 122, a hypervisor layer firewall, a satellite network, a broadband network, a cellular network, a private network, a cable network, the Internet, an internet protocol network, a multiprotocol label switching (MPLS) network, a content distribution network, any network or any combination thereof. Illustratively, servers 140 and 145 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 130, the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to servers 140, 145, 160, the first user device 102, the second user device 111, the integrity checker 120, the communications network 130, the software-defined networks 122, the hypervisor firewall 124, the peripherals/databases 131-134, or any combination thereof. The database 155 may also store information and metadata obtained from the system 100, store metadata and other information associated with the first and second users 101, 110, store alerts generated by the system 100, store statistics associated with the execution of operations, store each result for each operation that is executed, store the number of times each peripheral/database 131-134 is accessed, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information traversing the system 100, or any combination thereof. Furthermore, the database 155 may be configured to process queries sent to it by any device in the system 100.

Figure 4:
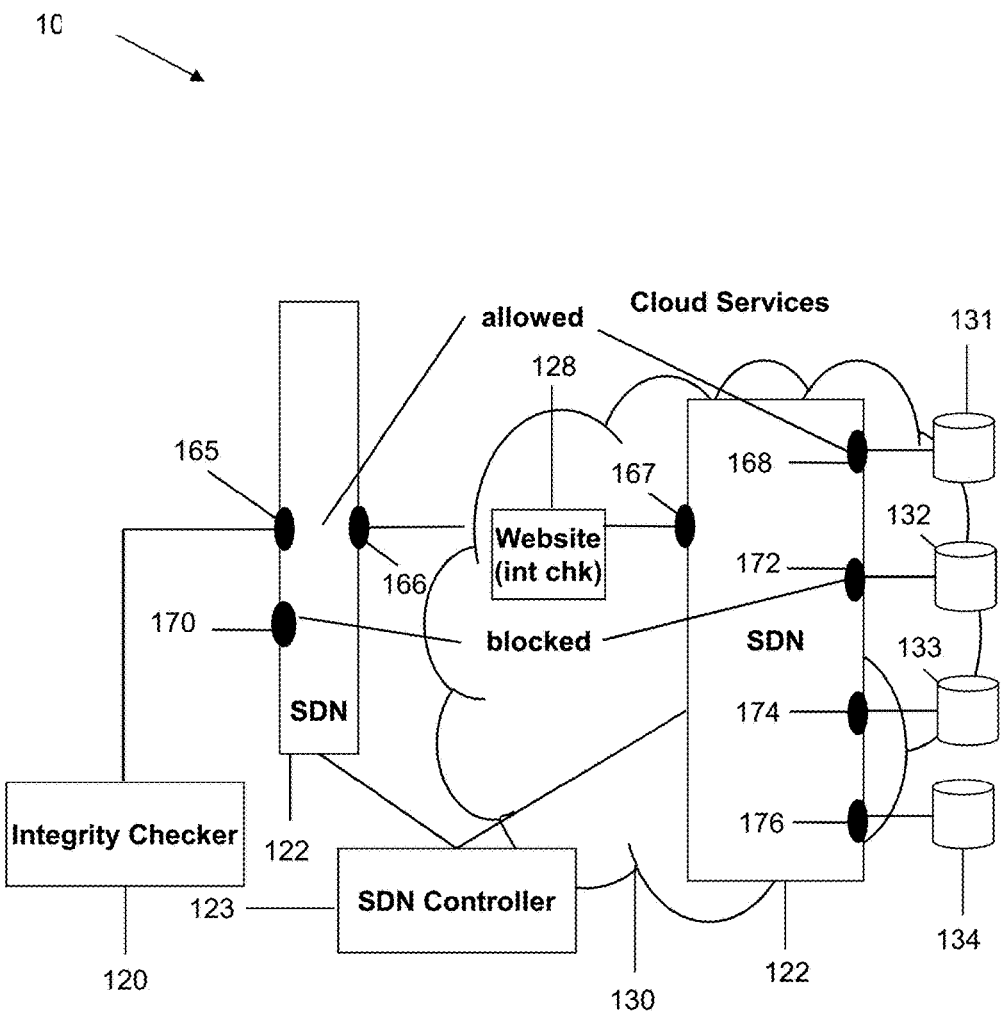
FIG. 4 illustrates the integrity checker of the system of FIG. 1 being utilized during a sample user authentication process.

Operatively, the system 100 may provide for cloud services integrity checking as shown in the following exemplary scenarios. In a first example scenario, as shown in FIG. 4, an integrity check is performed for a user authentication service provided by a website. For example, the user authentication service may be a service that is utilized to take inputs from users and perform operations to check if an inputted username and password match information found in a database. The integrity checker 120 may be in the integrity checking mode to check the integrity of the user authentication service. A virtual machine 128 may be spun up and dedicated for the integrity checker 120 to perform the integrity checking on the service. The virtual machine 128 may load a copy of the website that implements the user authentication service. Once the integrity checking process is initiated, the software-defined network controller 123 may impose the minimal set on the integrity checker 120 such that only peripheral 131, which, in this case, may be a user authentication database is accessible when executing operations associated with the user authentication service. Peripheral 132 may be a credit card database, peripheral 133 may be a backup database, and peripheral 134 may be a syslog archive. The software-defined network controller 123 may synchronize a software-defined network script with the integrity checking script of the integrity checker 120 to impose the minimum set for each operation associated with the user authentication service. In doing so, the software-defined network controller 123 may allow the integrity checker 120 to access ports 165 and 166 of software-defined network 122, and ports 167 and 168 to gain access to peripheral 131, which may be a user authentication database. The software-defined network controller 123 may simultaneously block access to ports 170, 172, 174, and 176 because the network access and peripherals 132-134 associated with ports 170, 172, 174, and 176 may not be necessary for completing operations associated with the user authentication service.

The integrity checking script may execute each step of each operation of the user authentication service and cause each result associated with each executed step of each operation to be logged for analysis. Each result may be analyzed by the system 100 to determine if any of the operations failed. If a failure does not exist, then the user authentication service may be functioning appropriately and the system behavior associated with the service may be expected. If, however, an analysis of the logged results indicate that at least one of the operations failed, the system 100 may determine that a change in an expected system behavior has occurred. For example, if the operation of matching the username with the password failed, the system 100 may determine that an unexpected change occurred in the system 100. The unexpected change, for example, may have been caused by an attacker perpetrating a ransomweb or other similar attack. The system 100 may generate one or more alerts based on the detected failures and/or changed system behaviors, perform actions to remedy the failures, perform actions to remove any malware inserted into the software associated with the service, or any combination thereof. After the integrity checking process is completed, the system 100 may shut down the virtual machine 128 and cause the integrity checker 120 to enter into normal operation mode. When the integrity checker 120 is in normal operation mode, the integrity checker 120 may not have the minimum set imposed on it, and, instead, may have full access to the peripherals 131-134 and to port 170.

Figure 5:
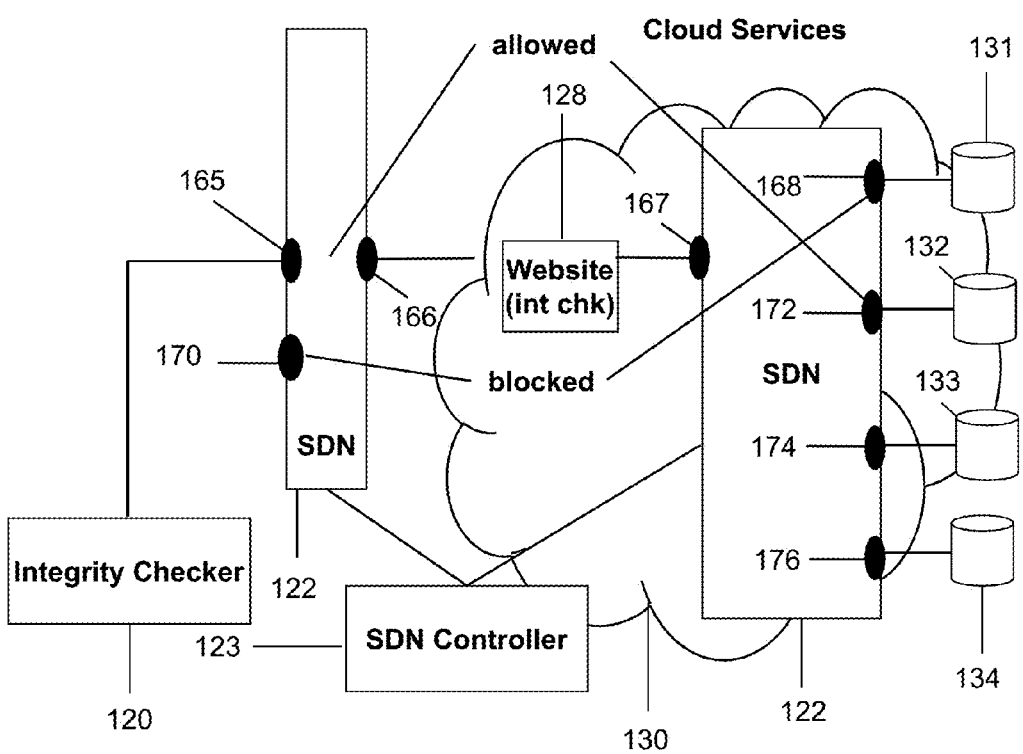
FIG. 5 illustrates the integrity checker of the system of FIG. 1 being utilized during a sample user purchase process.

In a second example scenario, as shown in FIG. 5, an integrity check is performed for a user purchase service provided by a website. For example, the user purchase service may be a service provided on an e-commerce website that allows a user to purchase one or more goods or services. As in the previous example, the integrity checker 120 may be in the integrity checking mode to check the integrity of the user purchase service. A virtual machine 128 may be spun up and dedicated for the integrity checker 120 to perform the integrity checking on the user purchase service. The virtual machine 128 may load a copy of the website that implements the user purchase service. Once the integrity checking process is initiated, the software-defined network controller 123 may impose the minimal set on the integrity checker 120 such that only peripheral 132, which, in this case, may be a credit card database is accessible when executing operations associated with the user purchase service. The software-defined network controller 123 may synchronize a software-defined network script with the integrity checking script of the integrity checker 120 to impose the minimum set for each operation associated with the user purchase service. In doing so, the software-defined network controller 123 may allow the integrity checker 120 to access ports 165 and 166 of the software-defined network 122, and ports 167 and 172 to gain access to peripheral 132, which is the credit card database. The software-defined network controller 123 may simultaneously block access to ports 170, 168, 174, and 176 because the network access and peripherals 131, 133, and 134 associated with ports 170, 168, 174, and 176 may not be necessary for completing operations associated with the user purchase service.

As in the previous example, the integrity checking script may execute each step of each operation of the user purchase service and cause each result associated with each executed step of each operation to be logged for analysis. Each result may be analyzed by the system 100 to determine if any of the operations for the user purchase service failed. If a failure does not exist, then the user purchase service may be functioning appropriately and the system behavior associated with the service may be expected. If, however, an analysis of the logged results indicate that at least one of the operations failed, the system 100 may determine that a change in an expected system behavior has occurred. For example, if the operation of retrieving credit card information from the peripheral 132 failed, the system 100 may determine that an unexpected change occurred in the system 100. The unexpected change, for example, may have been caused by an attacker perpetrating a ransomweb or other similar attack. The system 100 may generate one or more alerts based on the detected failures and/or changed system behaviors, perform actions to remedy the failures, perform actions to remove any malware inserted into the software associated with the service, or any combination thereof. After the integrity checking process is completed, the system 100 may shut down the virtual machine 128 and cause the integrity checker 120 to enter into normal operation mode. When the integrity checker 120 is in normal operation mode, the integrity checker 120 may not have the minimum set imposed on it, and, instead, may have full access to the peripherals 131-134 and access to port 170.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, activating the integrity checking script, initializing virtual machines, shutting down virtual machines, executing sets of operations associated with various services based on a minimum set, logging results for each operation that is executed, analyzing each result to determine if a failure for an operation exists, determining if a change in expected system behavior has occurred, generating alerts based on detection of failures and/or expected system behaviors, performing actions to correct failures and/or changes in expected system behavior, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a firewall 115, a router 117, a load balancer 119, integrity checker 120, software-defined networks 122, a software-defined network controller 123, a hypervisor layer firewall 124, a communications network 130, peripherals/databases 131-134, a communications network 135, a server 140, a server 145, a server 160, and a database 155. However, the system 100 may include multiple first user devices 102, multiple second user devices 111, multiple firewalls 115, multiple routers 117, multiple load balancers 119, multiple integrity checkers 120, multiple software-defined networks 122, multiple software-defined network controllers 123, multiple hypervisor layer firewalls 124, multiple communication networks 130, multiple peripherals/databases 131-134, multiple communications networks 135, multiple servers 140, multiple servers 145, multiple servers 160, multiple databases 155, or any number of any of the other components in the system 100. Furthermore, in certain embodiments, substantial portions of the functionality and operations of the system 100 may be performed by other networks and systems that may be connected to system 100.

Figure 6:
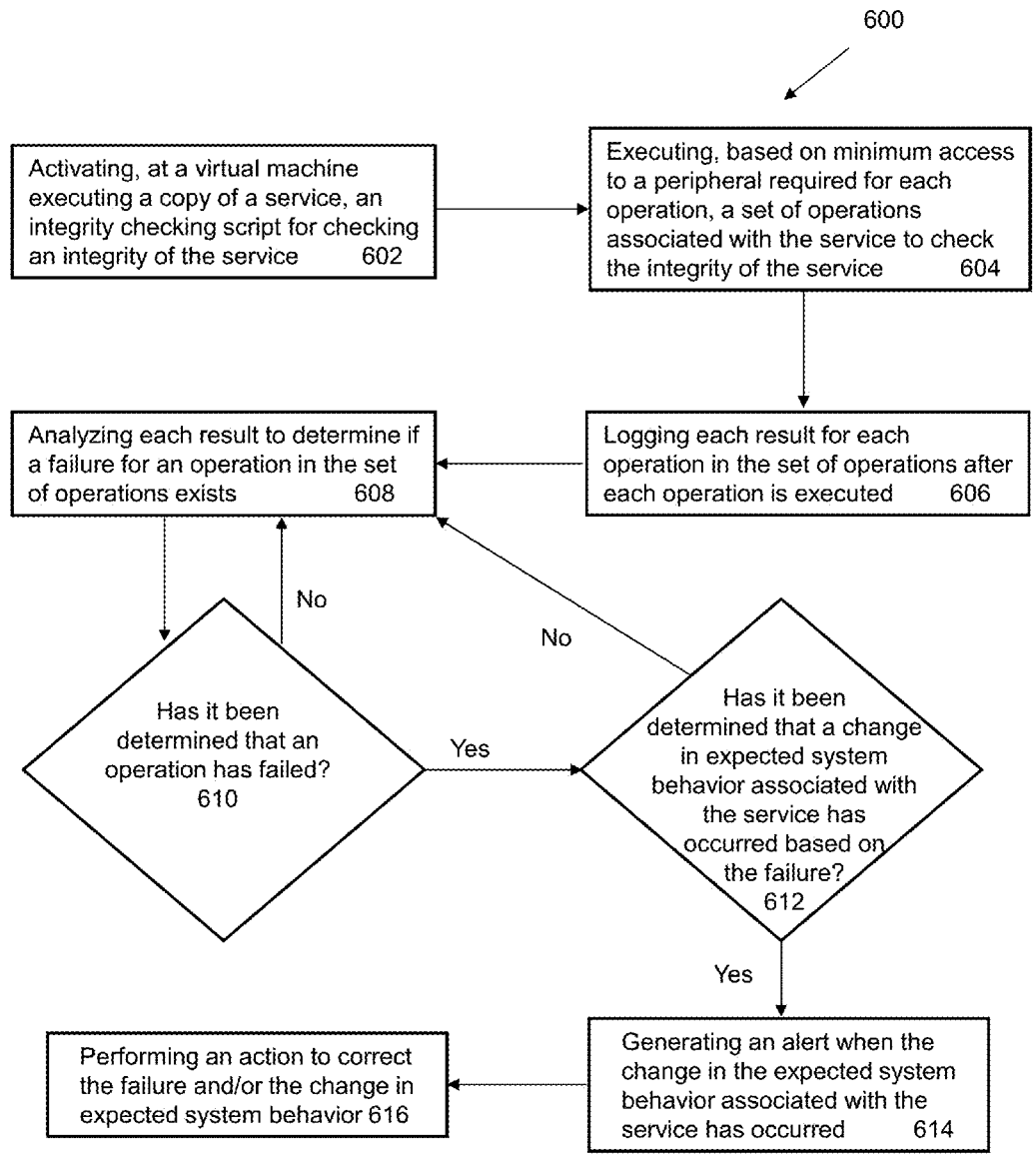
FIG. 6 is a flow diagram illustrating a sample method for cloud services integrity checking according to an embodiment of the present disclosure.
Figure 7:
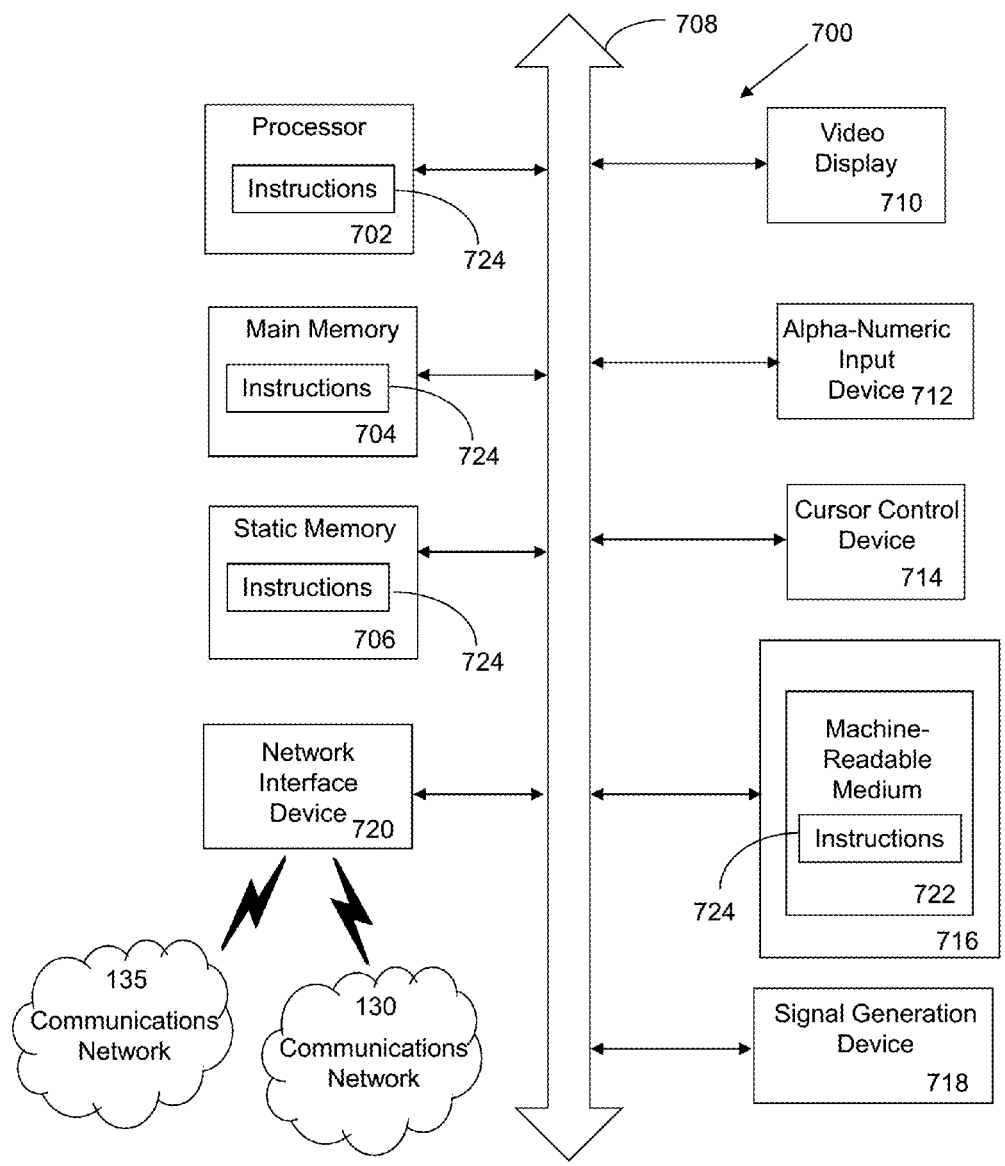
FIG. 7 is a schematic diagram of a machine in the form of a computer system within which a set of instructions, when executed, may cause the machine to perform any one or more of the methodologies or operations of the systems and methods for providing cloud services integrity checking.

As shown in FIG. 6, an exemplary method 600 for providing cloud services integrity checking is schematically illustrated, and may include, at step 602, launching, at a virtual machine, an integrity checking script for checking the integrity of a particular service. The virtual machine may be executing a copy of the service, a copy of the service with or without embedded malware, or any combination thereof. For example, if the service is associated with a website, a virtual machine may be spun up that loads a copy of the front-end of the website. In such an embodiment, the integrity checking script may be launched at the virtual machine that loads the copy of the front-end of the website. In certain embodiments, the launching may be performed by utilizing the integrity checker 120, the virtual machines 126-128, the server 140, the server 145, the server 160, any combination thereof, or by utilizing any other appropriate program, system, or device. At step 604, the method 600 may include executing, a set of operations associated with the service to check the integrity of the service during an integrity checking mode. Notably, the set of operations may be executed based on a minimum set that is enforced by a software-defined network 122, a hypervisor layer firewall 124, or any combination thereof. By enforcing the minimum set, only the minimum level of access to peripherals necessary for each step of each operation is allowed during execution of the operations. Any other access may be suspended during execution of the set of operations. As an example, a software-defined network script may be synchronized with the integrity checking script to ensure that each user operation is executed and/or performed with the minimum set enforced. In certain embodiments, the operations may be executed and the minimum set may be enforced by utilizing the integrity checker 120, the virtual machines 126-128, the software-defined networks 122, the software-defined network controller 123, the hypervisor layer firewall 124, the server 140, the server 145, the server 160, any combination thereof, or by utilizing any other appropriate program, system, or device.

As the operations are being executed, the method 600 may include, at step 606, logging each result for each operation in the set of operations after each operation is executed. In certain embodiments, the logging may be performed by the integrity checker 120, the virtual machines 126-128, the database 165, any combination thereof, or by any other appropriate program, system, or device. At step 608, the method 600 may include analyzing each result to determine if a failure for an operation in the set of operations exists. In certain embodiments, the analyzing may be performed by utilizing the virtual machines 126-128, the integrity checker 120, the software-defined networks 122, the hypervisor layer firewall 124, the server 140, the server 145, the server 160, any combination thereof, or by utilizing any other appropriate program, system, or device. At step 610, the method 600 may include determining if an operation of the set of operations has failed. In certain embodiments, the determination may be performed by utilizing the virtual machines 126-128, the integrity checker 120, the software-defined networks 122, the hypervisor layer firewall 124, the server 140, the server 145, the server 160, any combination thereof, or by utilizing any other appropriate program, system, or device.

If, at step 610, an operation has not been determined to have failed, the method 600 may continue repeating step 608 until a failure is detected. If, however, a failure is detected, the method 600 may include determining, at step 612, whether a change in expected system behavior associated with the service has occurred based on the detected failure. In certain embodiments, the determining may be performed by utilizing the virtual machines 126-128, the integrity checker 120, the software-defined networks 122, the hypervisor layer firewall 124, the server 140, the server 145, the server 160, any combination thereof, or by utilizing any other appropriate program, system, or device. If the determining indicates that no change in expected system behavior has occurred based on the failure, the method 600 may revert back to step 608. If, however, the determining indicates that a change in expected system behavior has occurred, the method 600 may include generating, at step 614, an alert. The alert may be any type of alert, such as, but not limited to a visual alert, an audible alert, any combination thereof, or any other type of alert. The alert, for example, may be transmitted to a service provider, network administrator, the first and second users 101, 110, or any combination thereof. In certain embodiments, the alert may be generated by utilizing the virtual machines 126-128, the integrity checker 120, the software-defined networks 122, the hypervisor layer firewall 124, the server 140, the server 145, the server 160, any combination thereof, or by utilizing any other appropriate program, system, or device. At step 616, the method 600 may include performing an action to correct the failure, correct the change in the expected system behavior, modify the system behavior, modify the service, execute an anti-virus program to remove any malware that may have caused the failure or change, identify an attacker, identifying a cause of the failure, identifying the cause of the change in system behavior, perform any type of action, or any combination thereof. In certain embodiments, the action may be performed by utilizing the virtual machines 126-128, the integrity checker 120, the software-defined networks 122, the hypervisor layer firewall 124, the server 140, the server 145, the server 160, any combination thereof, or by utilizing any other appropriate program, system, or device. Notably, the method 600 may incorporate any of the features and functionality described for the system 100 or as otherwise described herein.

Notably, the systems and methods disclosed herein may include additional functionality and features. For example, during normal operation mode, the integrity checker 120 may mimic a typical user and be treated by the system 100 as a typical user. In such a scenario, the integrity checker 120 itself may step through each operation of a service as if it is a regular user. If the service is compromised in some manner, the integrity checker 120 may be contaminated as if it were a regular user attempting to access the compromised service. The system 100 may perform analysis on the contaminated integrity checker 120 to determine how the malware that is affecting the service perpetrates its attack. The system 100 may then use this information to remove the malware, prevent future malware from infecting the service, or any combination thereof. Additionally, the systems and methods disclosed herein are not limited to detecting system changes that are caused by attacks or intruders, but may be utilized to detect any type of change in system behavior or any type of failure of an operation associated with any type of service.

Referring now also to FIG. 700, at least a portion of the methodologies and techniques described with respect to the exemplary embodiments of the system 100 can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 130, communications network 135, another network, or a combination thereof) to and assist with operations performed by other machines and systems, such as, but not limited to, the first user device 102, the second user device 111, the firewall 115, the router 117, the load balancer 119, the integrity checker 120, the software-defined networks 122, the software-defined network controller 123, the hypervisor layer firewall 124, the peripherals/databases 131-134, the server 140, the server 145, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 722 containing instructions 724 so that a device connected to the communications network 130, the communications network 135, another network, or a combination thereof, can send or receive voice, video or data, and to communicate over the communications network 130, the communications network 135, another network, or a combination thereof, using the instructions. The instructions 724 may further be transmitted or received over the communications network 130, the communications network 135, another network, or a combination thereof, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
    a memory that stores instructions; and
    a processor that executes the instructions to perform operations, the operations comprising:
        executing, by utilizing a virtual machine executing a copy of a service and by utilizing an integrity checking script activated at the virtual machine, a set of operations associated with the service to check the integrity of the service, wherein the set of operations are executed based on a minimum level of access to a peripheral that is required for each operation in the set of operations to be executed, wherein the minimum level of access is established by suspending access to a network port;
        executing, when the system is in a normal operation mode, the set of operations associated with service based on a full level of access to the peripheral and the network port;
        logging each result for each operation in the set of operations after each operation is executed;
        analyzing, by utilizing the virtual machine, each result for each operation in the set of operations to determine if a failure for an operation in the set of operations exists; and determining, if the failure exists, that a change in a system behavior associated with the service has occurred.

2. The system of claim 1, wherein the operations further comprise activating the integrity checking script.

3. The system of claim 2, wherein the operations further comprise activating the integrity checking script at periodic intervals.

4. The system of claim 3, wherein the operations further comprise performing an analysis on an integrity checking script when the integrity checking script is contaminated.

5. The system of claim 1, wherein the operations further comprise mimicking a user by utilizing the virtual machine.

6. The system of claim 1, wherein the operations further comprise determining if malware is affecting the service.

7. The system of claim 6, wherein the operations further comprise removing the malware if the malware is determined to be affecting the service.

8. The system of claim 1, wherein the operations further comprise generating an alert when the change in the system behavior associated with the service has occurred.

9. The system of claim 1, wherein the operations further comprise enforcing the minimum level of access to the peripheral by synchronizing a software-defined network script with the integrity checking script.

10. The system of claim 1, wherein the operations further comprise logging a number of times the peripheral is accessed during execution of the set of operations.

11. The system of claim 1, wherein the operations further comprise suspending access to other peripherals.

12. The system of claim 1, wherein the operations further comprise determining a manner in which malware affecting the service is perpetrating an attack on the service.

13. The system of claim 1, wherein the operations further comprise enforcing the minimum level of access to the peripheral by utilizing a hypervisor layer firewall.

14. A method, comprising:
processing, by utilizing a virtual machine executing a copy of a service and by utilizing an integrity checking script executing at the virtual machine, a set of operations associated with the service to check the integrity of the service, wherein the set of operations are processed based on a minimum level of access to a peripheral that is required for each operation in the set of operations to be processed, wherein the minimum level of access is established by suspending access to a network port;
executing, when the system is in a normal operation mode, the set of operations associated with service based on a full level of access to the peripheral and the network port;
logging each result for each operation in the set of operations after each operation is executed or processed;
analyzing, by utilizing the virtual machine, each result for each operation in the set of operations to determine if a failure for an operation in the set of operations exists; and
determining, if the failure exists, a change in a system behavior associated with the service, wherein the determining is performed by utilizing instructions from a memory that are executed by a processor.

15. The method of claim 14, further comprising generating an alert when the change in the system behavior associated with the service has occurred.

16. The method of claim 14, further comprising determining if malware is affecting the service.

17. The method of claim 16, further comprising determining a manner in which the malware is perpetrating an attack on the service.

18. The method of claim 14, further comprising performing an analysis on an integrity checking script when the integrity checking script is contaminated.

19. The method of claim 14, further comprising removing malware if the malware is determined to be affecting the service.

20. A computer-readable device comprising instructions, which when executed by a processor, cause the processor to perform operations comprising:
executing, by utilizing a virtual machine executing a copy of a service and by utilizing an integrity checking script activated at the virtual machine, a set of operations associated with the service to check the integrity of the service, wherein the set of operations are executed based on a minimum level of access to a peripheral that is required for each operation in the set of operations, wherein the minimum level of access is established by suspending access to a network port;
executing, when the system is in a normal operation mode, the set of operations associated with service based on a full level of access to the peripheral and the network port;
logging each result for each operation in the set of operations after each operation is executed;
evaluating, by utilizing the virtual machine, each result for each operation in the set of operations to determine if a failure for an operation in the set of operations exists; and
determining, if the failure exists, an occurrence of a change in a system behavior associated with the service.

* * * * *